(12) United States Patent
Kapolnek

(10) Patent No.: US 10,552,589 B2
(45) Date of Patent: Feb. 4, 2020

(54) CONTROLLING ACCESS TO AN INTERFACE WITH A DONGLE

(71) Applicant: Micro Motion, Inc., Boulder, CO (US)

(72) Inventor: David J Kapolnek, Chanhassen, MN (US)

(73) Assignee: Micro Motion, Inc., Boulder, CO (US)

(*) Notice: Subject to any disclaimer, the term of this patent is extended or adjusted under 35 U.S.C. 154(b) by 0 days.

(21) Appl. No.: 15/567,681

(22) PCT Filed: May 15, 2015

(86) PCT No.: PCT/US2015/030982
§ 371 (c)(1),
(2) Date: Oct. 19, 2017

(87) PCT Pub. No.: WO2016/186606
PCT Pub. Date: Nov. 24, 2016

(65) Prior Publication Data
US 2018/0107810 A1    Apr. 19, 2018

(51) Int. Cl.
*G06F 7/04*     (2006.01)
*G06F 21/12*    (2013.01)
*G06F 9/445*    (2018.01)

(52) U.S. Cl.
CPC ........ *G06F 21/123* (2013.01); *G06F 9/44573* (2013.01); *G06F 2221/0711* (2013.01); *G06F 2221/2153* (2013.01)

(58) Field of Classification Search
None
See application file for complete search history.

(56) References Cited

U.S. PATENT DOCUMENTS

| | | |
|---|---|---|
| 5,357,573 A | 10/1994 | Walters |
| 6,177,957 B1 | 1/2001 | Anderson |
| 2006/0035707 A1* | 2/2006 | Nguyen ................. G07F 17/32 463/29 |
| 2006/0287110 A1* | 12/2006 | Klitsner ................. A63F 13/10 463/44 |
| 2007/0061893 A1* | 3/2007 | Black ...................... G06F 21/10 726/27 |
| 2010/0017793 A1 | 1/2010 | Grover et al. |
| 2011/0023081 A1* | 1/2011 | Mornhineway ........ G08C 17/02 725/151 |
| 2012/0311314 A1* | 12/2012 | Cumming ............... G06F 21/51 713/2 |

FOREIGN PATENT DOCUMENTS

| | | |
|---|---|---|
| JP | 2005050162 A | 2/2005 |
| JP | 2006221563 A | 8/2006 |
| JP | 2011076541 A | 4/2011 |
| WO | 2009035777 A1 | 3/2009 |
| WO | 2015018579 A1 | 2/2015 |

\* cited by examiner

*Primary Examiner* — Brandon S Hoffman
(74) *Attorney, Agent, or Firm* — The Ollila Law Group LLC

(57) ABSTRACT

A dongle (100) for controlling access to an interface (200) is provided. The dongle (100) includes a dongle memory (120) configured to communicatively couple to the interface (200), the dongle memory (120) comprising a program code (122) that includes authorized menus (122a), wherein the program code (122) is configured to authorize access to one or more menus on the interface (200).

22 Claims, 10 Drawing Sheets

CONTROLLING ACCESS TO AN INTERFACE WITH A DONGLE

TECHNICAL FIELD

The embodiments described below relate to interfaces for industrial equipment and, more particularly, to controlling access to an interface with a dongle.

BACKGROUND

Industrial equipment can include interfaces that are accessed by many different users. For example, multiple work shifts may interact with a particular piece of industrial equipment via the equipment's interface. The interface typically includes software and settings that control and monitor the industrial equipment. For example, the software may include menus that, when accessed, can affect the operation of the industrial equipment. Inappropriate changes to the software and settings may adversely affect the reliable operation of the industrial equipment and can even result in catastrophic events.

Many industries try to ensure reliable operation of their equipment by limiting access to the interface with logins and passwords. For example, each user of the interface may be set up with a unique login and password. To access the menus on the interface, the user enters the login and password. However, since there are many users for each interface, logins and passwords for each user can unduly consume limited computing resources in the interface. In addition, the logins and passwords are susceptible to human foibles, such as forgotten or shared passwords. Therefore, using the logins and passwords to control access to the interface is not only burdensome, but may also result in unauthorized access by users.

Accordingly, there is a need for authorizing access to an interface without an undesirable consumption of computing resources on the interface. There is also a need for managing authorizations for a large number of users for the interface while preventing unauthorized access. These and other needs can be met by controlling access to the interface with a dongle.

SUMMARY

A dongle for controlling access to an interface is provided. According to an embodiment, the dongle comprises a dongle memory configured to communicatively couple to the interface. The dongle memory comprises a program code that includes authorized menus. The program code is configured to authorize access to one or more menus on the interface.

A system for controlling access to an interface with a dongle is provided. According to an embodiment, the system comprises the dongle configured to communicatively couple to the interface, the dongle including a dongle memory comprising a program code that includes authorized menus and a processor communicatively coupled to the dongle memory. The processor is configured to receive the program code from the dongle memory and authorize access to one or more menus on the interface based on the authorized menus.

A method for controlling access to an interface is provided. According to an embodiment, the method comprises detecting a dongle communicatively coupled to the interface, the dongle comprising a dongle memory with a program code that includes authorized menus, reading a program code from the dongle memory with the interface, and authorizing access to one or more menus on the interface.

A system for remotely controlling access to an interface with a dongle is provided. According to an embodiment, the system comprises an authorizing workstation, and a user workstation communicatively coupled to the authorizing workstation through a network. The user workstation is configured to write a program code that includes a received dongle ID, the received dongle ID being provided to the authorizing workstation by the user workstation.

A method for remotely controlling access to an interface with a dongle is provided. According to an embodiment, the method comprises receiving a dongle ID from the dongle, encoding the received dongle ID into a program code, and writing the program code to the dongle with a user workstation.

Aspects

According to an aspect, a dongle (100) for controlling access to an interface (200) comprises a dongle memory (120) configured to communicatively couple to the interface (200). The dongle memory (120) comprises a program code (122) that includes authorized menus (122a). The program code (122) is configured to authorize access to one or more menus on the interface (200).

Preferably, the dongle (100) further comprises a connector (110) communicatively coupled to the dongle memory (120), wherein the connector (110) is configured to communicatively couple to the interface (200).

Preferably, the program code (122) further comprises a reference value (122b) and the dongle memory (120) further comprises a dongle ID (124) and wherein the reference value (122b) can be compared with the dongle ID (124) to determine if the program code (122) is associated with the dongle (100).

Preferably, the program code (122) is configured to at least one of authorize access and terminate authorization to the one or more menus on the interface (200) based on the authorized menus (122a).

Preferably, the program code (122) is executed by the interface (200) when the dongle (100) is at least one of communicatively coupled to the interface (200) and communicatively decoupled from the interface (200).

Preferably, the interface (200) is an interface for industrial equipment (5).

According to an aspect, a system (10) for controlling access to an interface (200) with a dongle (100) comprises the dongle (100) configured to communicatively couple to the interface (200). The dongle (100) includes a dongle memory (120) comprising a program code (122) that includes authorized menus (122a). The system (10) further comprises a processor (212) communicatively coupled to the dongle memory (120). The processor (212) is configured to receive the program code (122) from the dongle memory (120) and authorize access to one or more menus on the interface (200) based on the authorized menus (122a).

Preferably, the program code (122) further comprises a reference value (122b) and the dongle memory (120) further comprises a dongle ID (124) and wherein the processor (212) is further configured to compare the reference value (122b) with the dongle ID (124) to determine if the program code (122) is associated with the dongle (100).

Preferably, the processor (212) is configured to at least one of authorize access and terminate authorization to the one or more menus on the interface (200) based on the authorized menus (122a).

Preferably, the processor (212) is configured to at least one of authorize access and terminate authorization to the one or more menus on the interface (200) when the program code (122) is executed by the processor (212).

Preferably, the processor (212) is further configured to detect at least one of the dongle (100) communicatively coupled to the interface (200) and the dongle (100) communicatively decoupled from the interface (200).

Preferably, the interface (200) is an interface for industrial equipment (5). According to an aspect, a method for controlling access to an interface comprises detecting a dongle communicatively coupled to the interface. The dongle comprises a dongle memory with a program code that includes authorized menus. The method further comprises reading the program code from the dongle memory with the interface and authorizing access to one or more menus on the interface.

Preferably, the program code further comprises a reference value and the dongle memory further comprises a dongle identifier and wherein the method further comprises comparing with the dongle identifier to determine if the program code is associated with the dongle.

Preferably, the method further comprises detecting that the dongle is communicatively decoupled from the interface, determining if the authorization to the one or more of authorized menus on the interface has expired, and terminating authorization to the one or more menus on the interface.

Preferably, the program code is configured to at least one of the authorize access and the terminate authorization to the one or more menus on the interface based on the authorized menus.

Preferably, the program code is executed by the interface when the dongle is at least one of communicatively coupled to the interface and communicatively decoupled from the interface.

According to an aspect, a system (900) for remotely controlling access to an interface (200) with a dongle (100) comprises an authorizing workstation (910) and a user workstation (920) communicatively coupled to the authorizing workstation (910) through a network (930). The user workstation (920) is configured to write a program code (122) that includes a received dongle ID (124), the received dongle ID (124) being provided to the authorizing workstation (910) by the user workstation (920).

Preferably, at least one of the authorizing workstation (910) and the user workstation (920) is configured to encode the received dongle ID (124) into the program code (122).

Preferably, at least one of the authorizing workstation (910) and the user workstation (920) is a mobile device.

According to an aspect, a method for remotely controlling access to an interface with a dongle comprises receiving a dongle ID from the dongle, encoding the received dongle ID into a program code, and writing the program code to the dongle with a user workstation.

Preferably, the dongle ID is received by an authorizing workstation that is in communication with the user workstation through a network.

Preferably, the dongle ID is encoded into the program code by at least one of the authorizing workstation and the user workstation.

Preferably, at least one of the authorizing workstation and the user workstation is a mobile device.

BRIEF DESCRIPTION OF THE DRAWINGS

The same reference number represents the same element on all drawings. It should be understood that the drawings are not necessarily to scale.

DETAILED DESCRIPTION

FIGS. 1-10 and the following description depict specific examples to teach those skilled in the art how to make and use the best mode of embodiments for controlling access to an interface with a dongle. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of controlling the access to the interface with the dongle. As a result, the embodiments described below are not limited to the specific examples described below, but only by the claims and their equivalents.

The example systems and methods described below include an interface that can read a program code from a dongle. The program code may authorize access to one or more menus on the interface. The following examples can also prevent unauthorized access to the interface by counterfeit dongles. Also described is remotely controlling access to the interface, which includes receiving a dongle ID from a dongle at the user's location. The received dongle ID is encoded into a program code. The program code is written to the dongle, which may control access to an interface at the user's location.

A System for Controlling Access to an Interface With a Dongle

Figure 1:
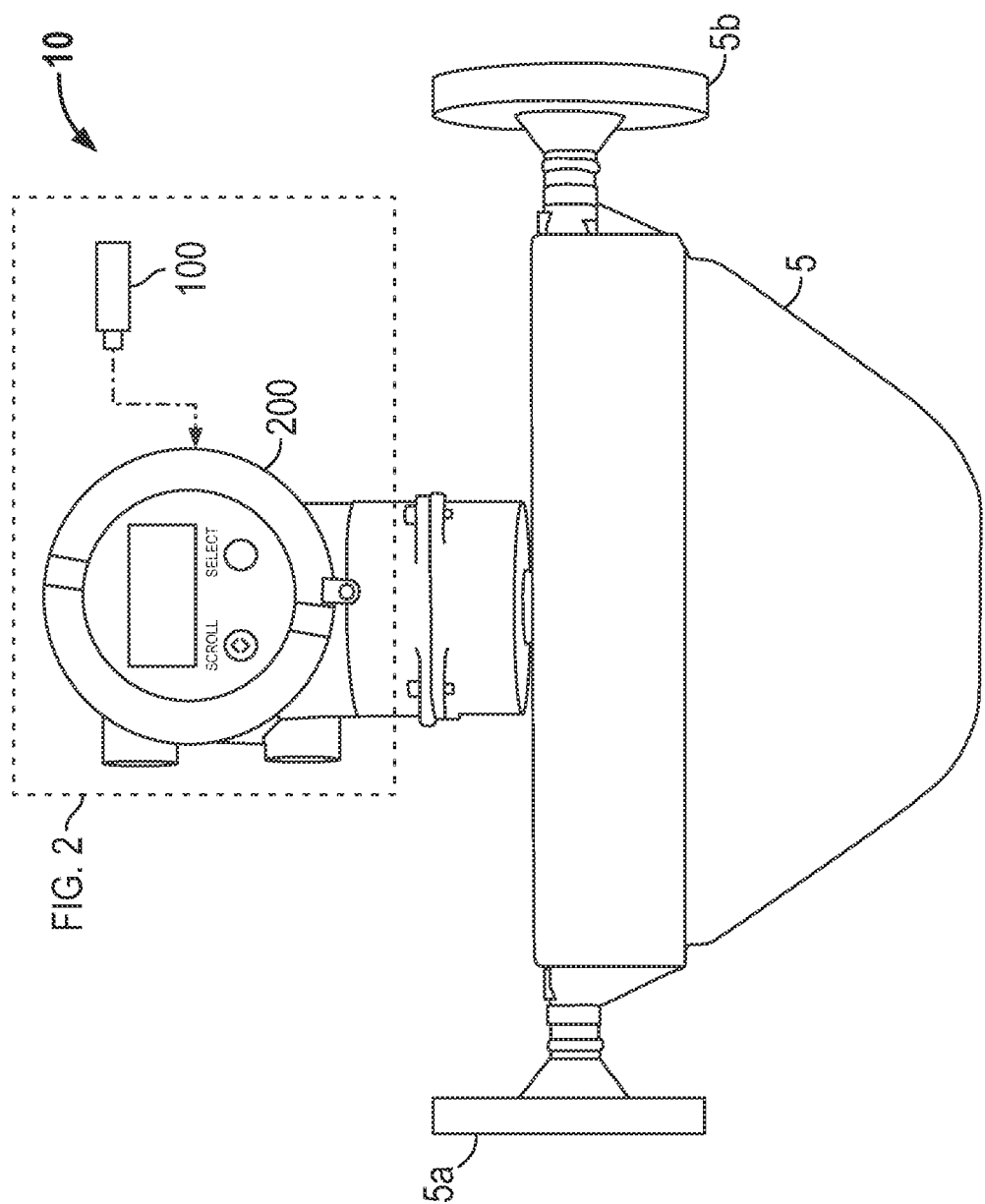
FIG. 1 shows a front perspective view of a system 10 for controlling access to an interface 200 with a dongle 100.

FIG. 1 shows a front perspective view of a system 10 for controlling access to an interface 200 with a dongle 100. The system 10 is shown with the dongle 100 proximate to but not inserted into the interface 200. The interface 200 is affixed to an industrial equipment 5. In the embodiment shown, the industrial equipment 5 is a Coriolis flow meter, such as those manufactured by Micro Motion, Inc. The Coriolis flow meter can measure properties of a material flowing through the Coriolis flow meter. In the embodiment shown, the material may flow through the Coriolis flow meter via inlet 5a and outlet 5b. In alternative embodiments, other types of equipment, such as tuning fork densitometers, flow control valves and systems, pressure transducers, temperature sensors, or the like, may be coupled to the interface 200.

The interface 200 is also communicatively coupled to the industrial equipment 5. That is, the interface 200 can send and/or receive signals from the industrial equipment 5. The signals can include, for example, measurement values that represent properties of the material flowing through the industrial equipment 5. Additionally or alternatively, the signals can include, for example, a drive signal, flow control signal (where the industrial equipment 5 includes flow control devices or the like), or other signals, that are sent to the industrial equipment 5. The signals can be electrical, optical, or any other appropriate form that may be transmitted through a conductor, wireless communication link, etc.

In the embodiment shown, the interface 200 is proximate to the industrial equipment 5. In alternative embodiments, the interface 200 may be at a location that is not proximate the industrial equipment 5. For example, the interface 200 may be in a control room that is remote from the industrial equipment 5, where the interface 200 is advantageously shielded from dangerous or harmful environments. In addition, the menus may be accessed remotely, which may be advantageous for users that are, for example, comparing data obtained from different industrial equipment dispersed over a large area. However, the interface 200 being proximate to the industrial equipment 5 may be advantageous when, for example, a user needs to be within reach of the industrial equipment 5 while accessing menus in the interface 200, which is described in more detail in the following.

Figure 2:
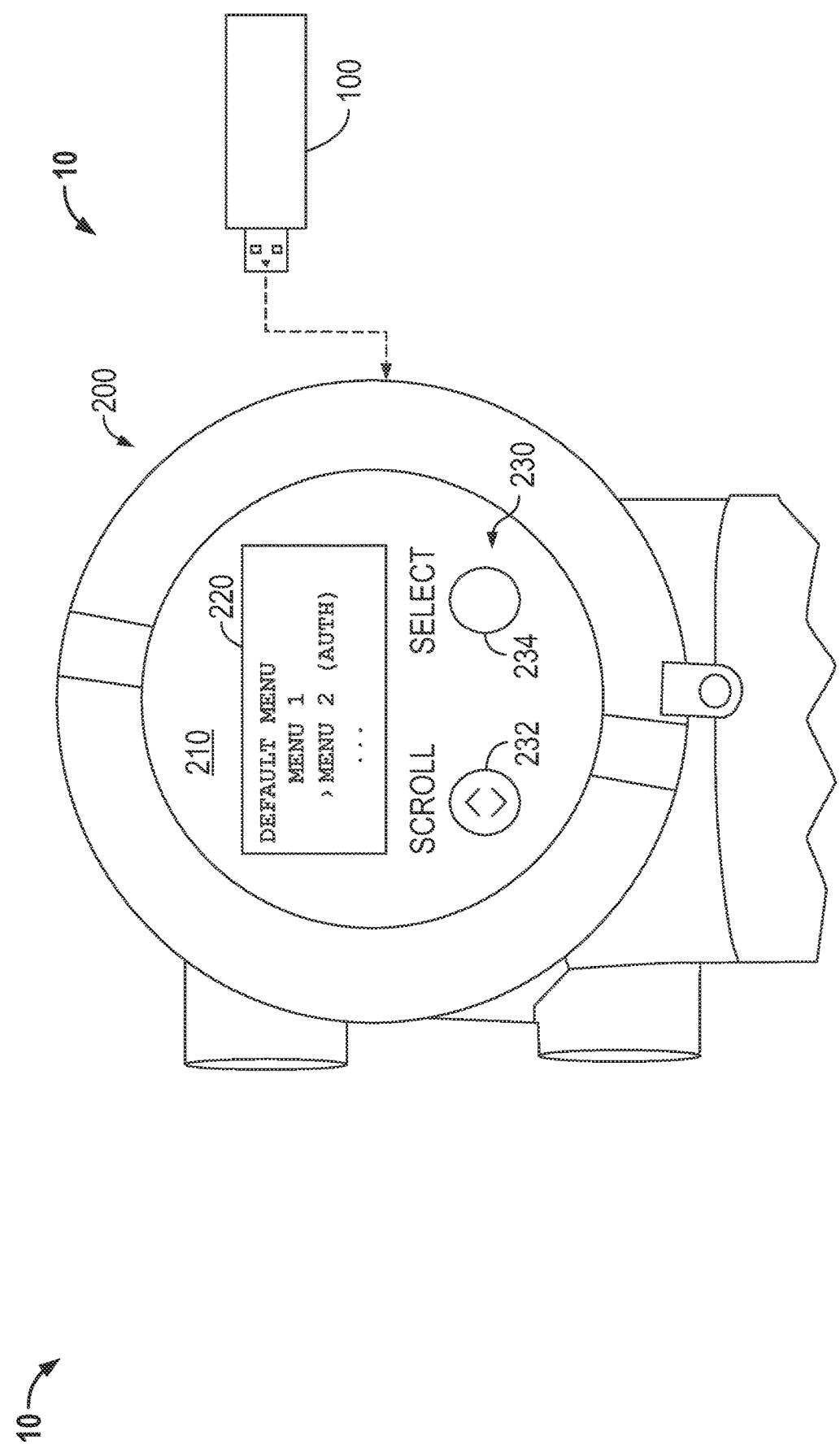
FIG. 2 shows an enlarged front perspective view of the dongle 100 and the interface 200 shown in FIG. 1.

FIG. 2 shows an enlarged front perspective view of the dongle 100 and the interface 200 shown in FIG. 1. As can be seen, the interface 200 has an interface panel 210 that is coupled to an interface display 220. An exemplary menu is shown in the interface display 220. The interface 200 also includes buttons 230. In the embodiment shown, the buttons 230 includes a scroll button 232 and a select button 234. A user can use the scroll button 232 to scroll through the menus until a desired menu is indicated. As shown in FIG. 2, the desired menu is indicated by an arrow ">". The user can then press the select button 234 to select the desired menu.

However, as shown in FIG. 2, the desired menu also has an authorization indicator, which is the "(AUTH)" next to "MENU 2." The authorization indicator may notify the user that the desired menu requires authorization. If the user attempts to select the desired menu prior to inserting the dongle 100, then the interface 200 may deny access to the desired menu. The user may insert the dongle 100 to obtain authorization to the desired menu. Other embodiments may include a dongle that is wirelessly enabled using, for example, the Bluetooth™ protocol and is therefore not inserted. Once authorization is obtained, the user can press the select button 234 to access the desired menu. The authorization may be obtained by reading a program code from the dongle 100, as will be explained in more detail in the following.

Dongle

Figure 3:
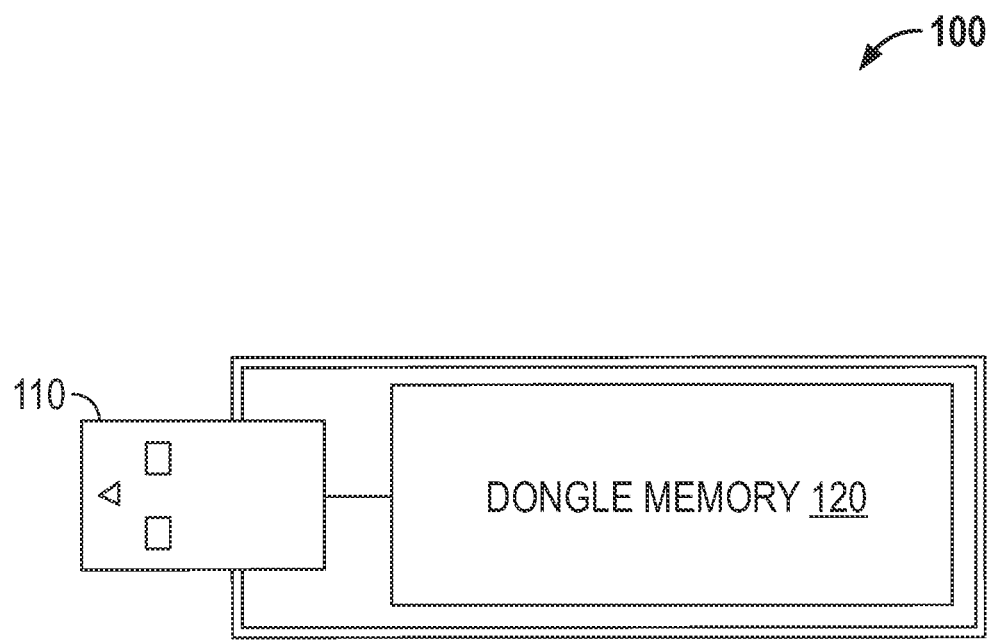
FIG. 3 shows a sectional plan view of the dongle 100 for controlling access to the interface 200.

FIG. 3 shows a sectional plan view of the dongle 100 for controlling access to the interface 200. The dongle 100 includes a connector 110 that is communicatively coupled to a dongle memory 120. The dongle 100 is shown as a Universal Serial Bus (USB) memory stick although any suitable communications protocol, connector, and/or memory can be employed in alternative embodiments. In the embodiment shown, and as will be described in more detail in the following with reference to FIG. 4, the dongle memory 120 can include code, data, or the like, that can control access to the interface 200.

The connector 110 is configured to communicatively couple to the interface 200. For example, in the embodiment shown, the connector 110 is a male USB connector that can mate with a female USB connector on the interface 200. Communication between the dongle 100 and the interface 200 can therefore occur using the USB protocol. In the embodiment shown in FIG. 3 and other embodiments, such as the embodiment where the dongle is wirelessly enabled, the dongle memory 120 may be configured to communicatively couple to the interface 200. The communication may include transferring information between the interface 200 and the dongle memory 120.

As shown in FIG. 3, the dongle memory 120 is a single piece of memory. The dongle memory 120 may be comprised of flash memory, which can be read from and written to multiple times and can store the program code, data, or the like, without being provided power. However, in alternative embodiments, two or more distinct and/or different types of memories may be employed. For example, the dongle memory 120 may be comprised of a flash memory for the code and a read-only memory (ROM) for the data. The ROM may be desirable to prevent modification of the data stored in the ROM. However, it may also be advantageous to include re-writable memory, such as the flash memory, to ensure that the dongle 100 can be modified. In these and other embodiments, the code and data stored in the dongle memory 120 can control access to the interface 200, as will be described in more detail in the following.

Figure 4:
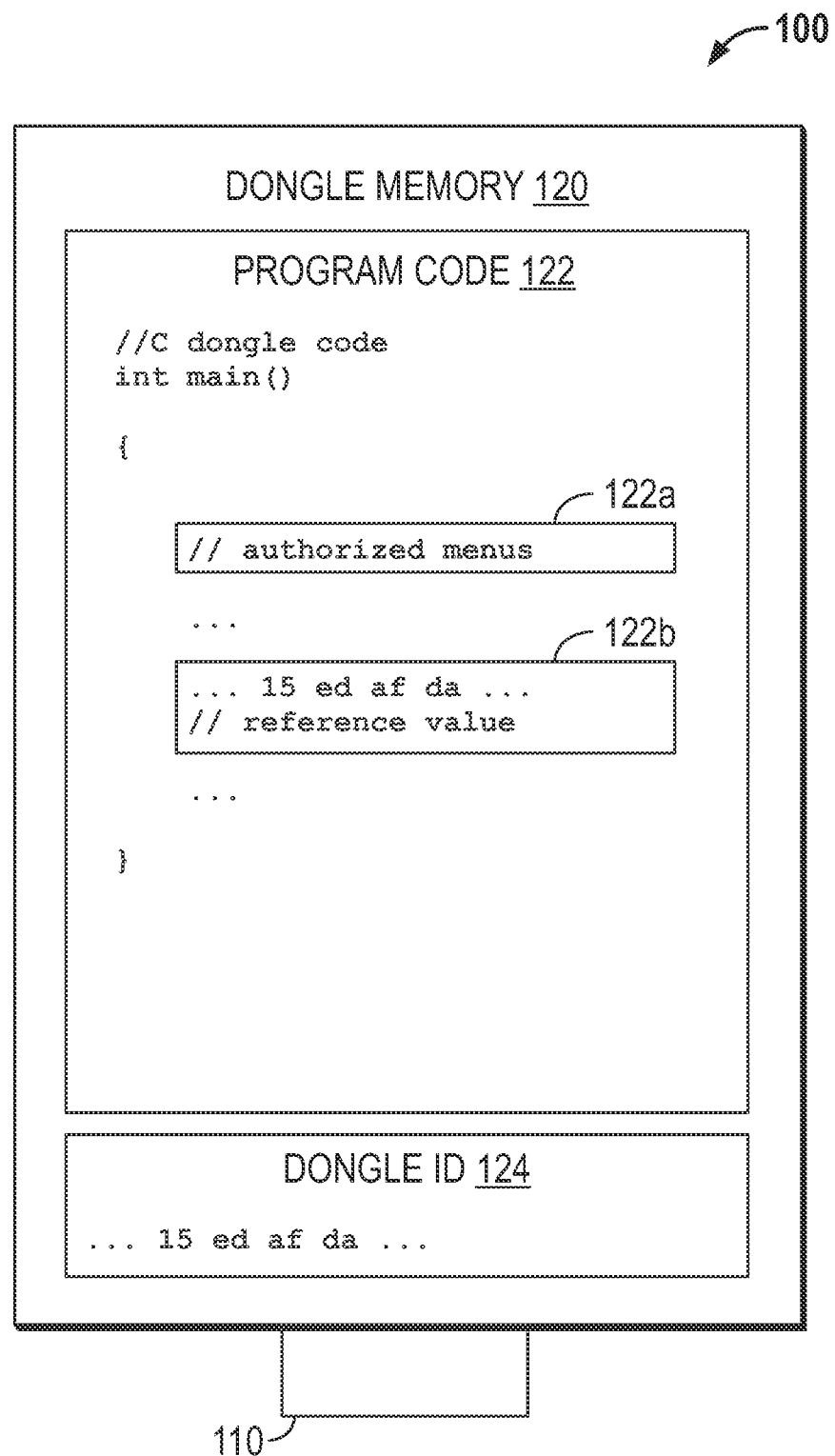
FIG. 4 shows a functional block diagram of the dongle 100 for controlling access to the interface 200 with the dongle 100.

FIG. 4 shows a functional block diagram of the dongle 100 for controlling access to the interface 200 with the dongle 100. As shown in FIG. 4, the dongle 100 includes the connector 110 and the dongle memory 120 described in the foregoing. The dongle memory 120 includes a program code 122. In the embodiment shown, the program code 122 is a C program that includes an authorized menus 122a portion and a reference value 122b, although any suitable language and program codes can be employed in alternative embodiments. The dongle memory 120 is also shown with a dongle ID 124 that is separate from the program code 122.

The authorized menus 122a can be a list of menus that correspond to one or more menus in the interface 200. The authorized menus 122a may be a subset or all of the available menus in the interface 200. The authorized menus 122a may be a simple text list of menus that correspond to labels of the menus in the interface 200. The list of menus may advantageously reduce the computing processing load on the interface 200. Additionally or alternatively, the authorized menus 122a may include values that are associated with subsets of menus in the interface 200. For example, rather than a list of menus, the authorized menus 122a can be a scalar value that the interface 200 associates with a subset of the menus in the interface 200. The scalar value may be advantageous by reducing the amount of data that must be read by the interface 200 before authorizing the user to access the interface 200. Authorizing the user can include reading the reference value 122b.

The reference value 122b is shown as a hexadecimal value although any suitable value may be employed. The reference value 122b associates the program code 122 with the dongle 100. For example, the reference value 122b may be associated with the particular dongle 100. In alternative embodiments, the reference value 122b may be associated with a set of dongles that are for a particular group of workers. For example, it may be desirable to have duplicates of the same software and dongle for different users that are authorized to access the same sets of menus on the interface 200. However, although multiple dongles can be produced, the dongle 100 may also prevent authorized access with a counterfeit dongle, as the following discussion illustrates.

Counterfeit Dongle

An unauthorized user might wish to access menus on the interface 200 but may not have physical control of the dongle 100 due to, for example, lack of training in operating the industrial equipment 5. Nevertheless, the unauthorized user may attempt to copy the program code 122 from the dongle 100 onto a counterfeit dongle that is in his control. However, if the program code 122 were to be copied into a memory of the counterfeit dongle, then the program code 122 may not be associated with the counterfeit dongle. For example, the counterfeit dongle may have a dongle ID that is different from the dongle ID 124 of the dongle 100 from which the program code 122 was copied.

To ensure that the program code 122 is not read from the counterfeit dongle, the interface 200 may execute a routine that prevents reading the program code 122. For example, before the interface 200 reads the program code 122, the interface 200 may compare the reference value 122b to the counterfeit dongle ID. The comparison may indicate that the program code 122 is not associated with the counterfeit dongle. As a result, the interface 200 is unable to execute the program code 122 from the counterfeit dongle. This can prevent the unauthorized user from accessing the interface 200.

To circumvent this restriction, the user may also attempt to copy the dongle ID 124 from the dongle memory 120 onto re-writable memory in the counterfeit dongle. However, when attempting to read the dongle ID from the counterfeit dongle, the interface 200 may be limited to a certain portion of the memory in the counterfeit dongle. For example, the interface 200 may be limited to a read-only portion of the memory in the counterfeit dongle for reading the dongle ID. Therefore, the dongle ID 124 that the unauthorized user copied onto the counterfeit dongle is not read by the interface 200.

Although the foregoing describes the reference value 122b and the dongle ID 124 as being stored in memory in plain text form, alternative means of storage may be employed in alternative embodiments. For example, it may be desirable to store the reference value 122b in encrypted form. The reference value 122b may be encrypted with a key that is retained by the interface 200. Without the key, the unauthorized user could not create an encrypted reference value that is associated with the dongle ID of the counterfeit dongle.

Other methods of preventing unauthorized access to the interface 200 with the counterfeit dongle may be employed. Because the dongle ID 124 and the reference value 122b indicates that the dongle 100 is not a counterfeit dongle, the dongle 100 may be read by the interface 200. Accordingly, the dongle 100 can communicatively couple to the interface 200 to control access to the interface 200.

A Dongle Communicatively Coupled to an Interface

Figure 5:
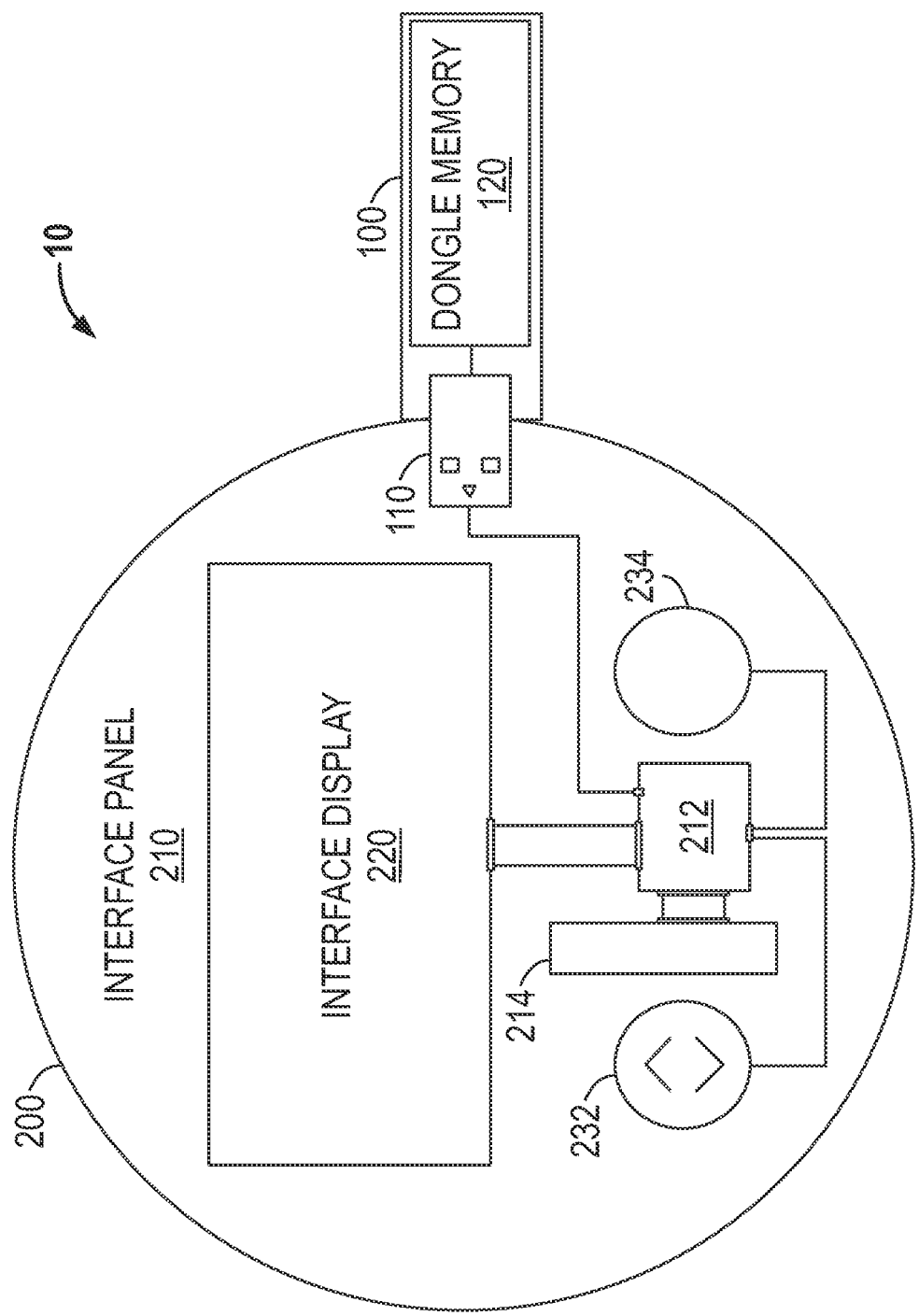
FIG. 5 shows a block diagram of the system 10 according to an embodiment where the dongle 100 is inserted into the interface 200.

FIG. 5 shows a block diagram of the system 10 according to an embodiment where the dongle 100 is inserted into the interface 200. As can be seen, the dongle memory 120 is communicatively coupled to the interface 200 via the connector 110. In the embodiment shown, the interface panel 210 includes a processor 212 that is communicatively coupled with the dongle memory 120. The processor 212 is also communicatively coupled with an interface memory 214 and the interface display 220. As is explained in the following, the processor 212 is configured to authorize access to one or more menus on the interface 200.

The processor 212 is configured to receive the program code 122 and the dongle ID 124 from the dongle 100. The processor 212 may also be configured to write the program code 122 and the dongle ID 124 to the interface memory 214. The processor 212 can receive signals from the scroll button 232 and the select button 234. Therefore, when the user presses the select button 234, the processor 212 may display one or more menus on the interface display 220. Whether or not the selected menu is displayed on the interface display 220 depends on whether the dongle 100 authorizes access to the one or more menus. The processor 212 can determine whether the dongle 100 authorizes access to the one or more menus with the program code 122 read from the dongle memory 120. Accordingly, the processor 212 may perform methods that control access to the interface 200. Exemplary methods are described in the following.

Methods for Controlling Access to an Interface with a Dongle

Figure 6:
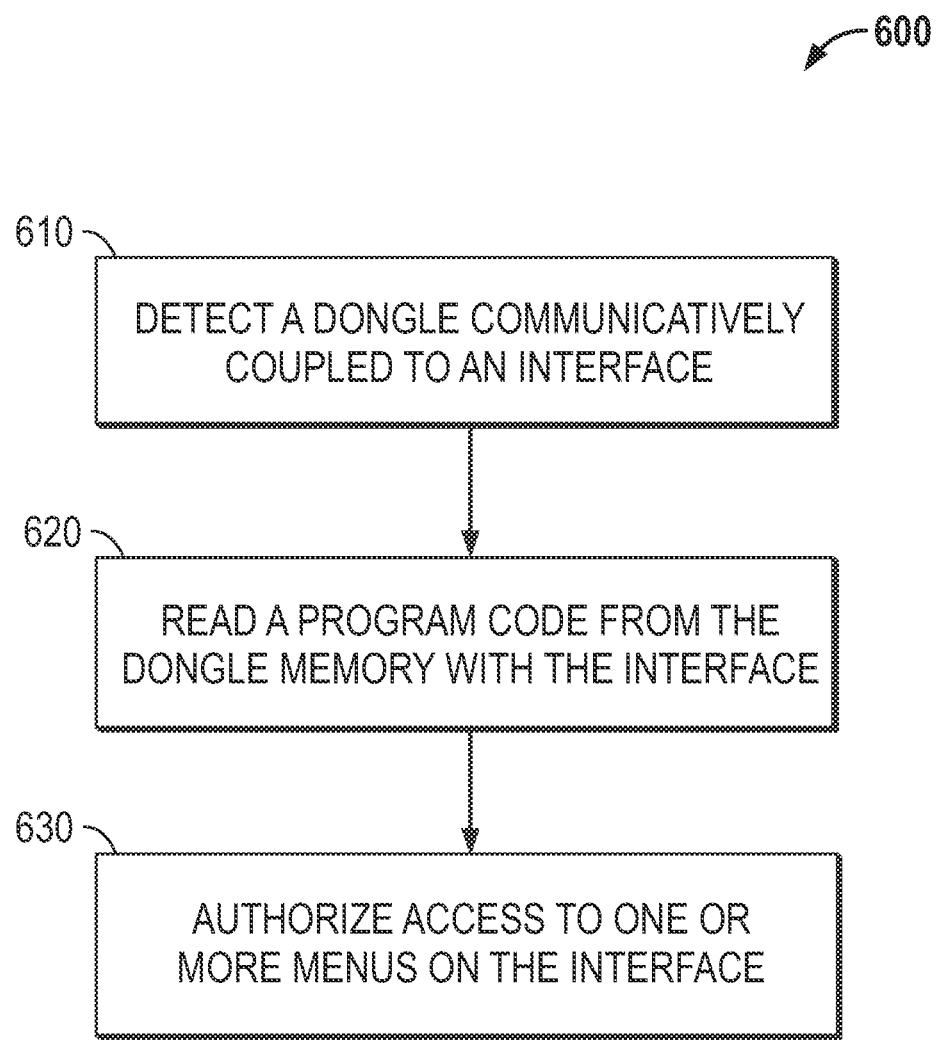
FIG. 6 shows a method 600 of controlling access to an interface when a dongle is communicatively coupled to the interface.

FIG. 6 shows a method 600 of controlling access to an interface when a dongle is communicatively coupled to the interface. In the embodiment shown, the method 600 detects a dongle communicatively coupled to the interface in step 610. The dongle of the method 600 may be the dongle 100 described in the foregoing. Similarly, the interface of the method 600 may be the interface 200 described in the foregoing. In step 620, the method 600 reads a program code from the dongle with the interface. The program code read by the method 600 may be the program code 122 described in the foregoing. In step 630, the method 600 authorizes access to one or more menus of the interface when the program code is executed on the interface.

In step 610, the method 600 can detect the dongle communicatively coupled to the interface in various ways. For example, with reference to the embodiments described in the foregoing, the method 600 can detect the dongle 100 using the USB protocol. Additionally or alternatively, the interface may not detect the dongle until the user enters a command on the interface to mount the dongle. Alternative embodiments may employ different methods of detecting the dongle communicatively coupled to the interface. After detecting the dongle, the method 600 may read a program code and data from the dongle.

In step 620, the method 600 can read the program code from the dongle memory by, for example, verifying that the program code is associated with the dongle. With reference to the dongle 100 described in the foregoing, the interface 200 may read the reference value 122b and the dongle ID 124 from the dongle 100. The interface 200 can compare the reference value 122b and the dongle ID 124 to determine if the program code 122 is associated with the dongle 100. For example, the processor 212 may determine if the reference value 122b is equal to the dongle ID 124. After verifying that the program code is associated with the dongle, the method 600 may continue to step 630.

In step 630, the method 600 may authorize access to one or more menus in the interface. With reference to the interface 200 described in the foregoing, the processor 212 may display one or more menus stored in the interface memory 214 on the interface display 220. However, prior to displaying the one or more menus, the processor 212 may compare the one or more menus in the interface memory 214 with the authorized menus 122a in the program code 122. If the one or more menus are in the authorized menus 122a, the processor 212 may display the one or more menus on the interface display 220. The one or more menus may be displayed after the user selects the desired menu with the select button 234.

As discussed in the foregoing, the dongle can also be communicatively decoupled from an interface. Communicatively decoupling the dongle from the interface can cause the authorization to the one or more menus to terminate, as will be described in more detail in the following with reference to FIG. 7.

Terminating Authorization

Figure 7:
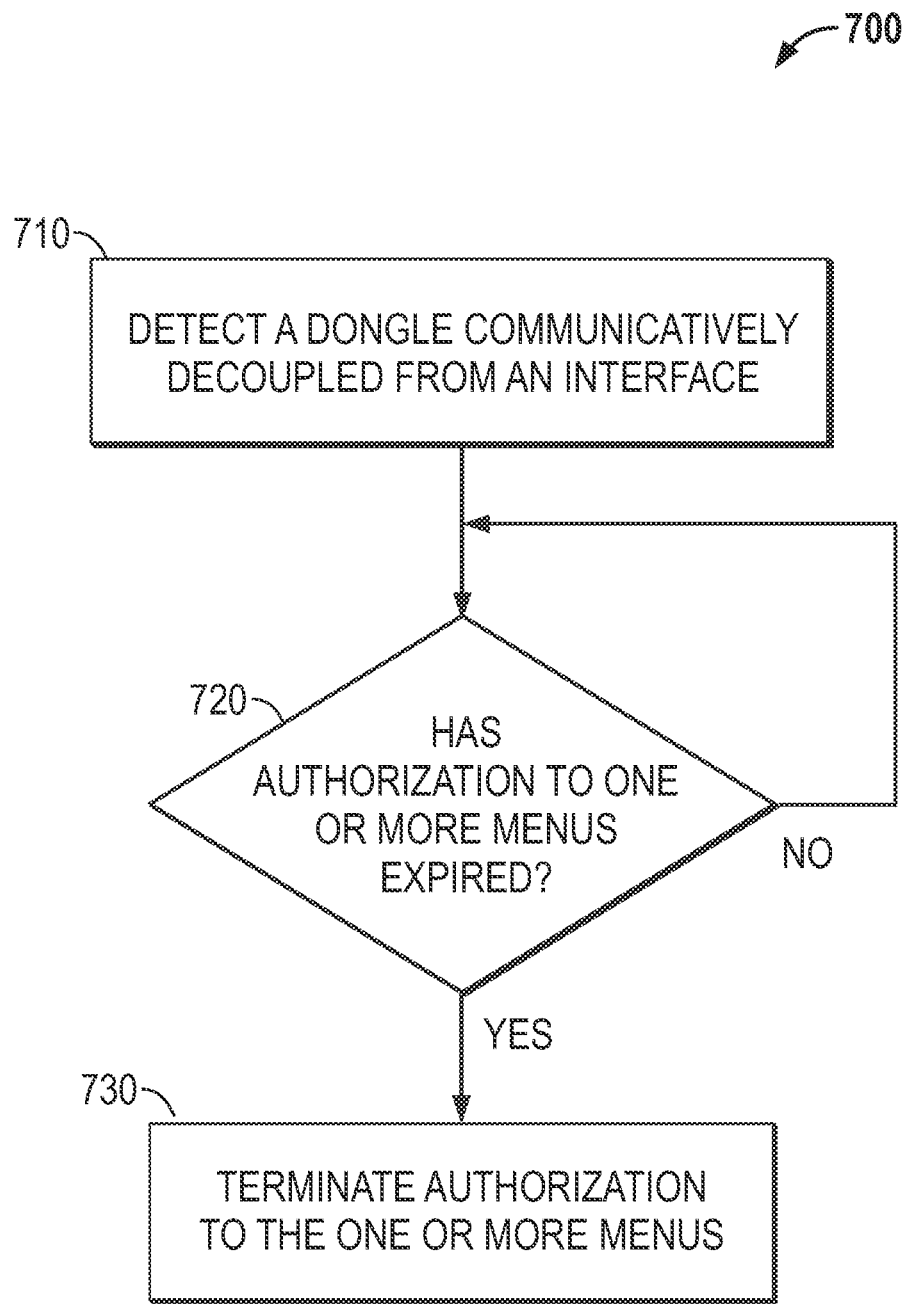
FIG. 7 shows another method 700 for controlling access to an interface with a dongle according to an embodiment where the dongle is removed from the interface.

FIG. 7 shows another method 700 for controlling access to an interface with a dongle according to an embodiment where the dongle is removed from the interface. In step 710, the method 700 may detect that the dongle is communicatively decoupled from the interface. The dongle and interface may be the dongle 100 and interface 200 described in the foregoing. In step 720, the method 700 can determine if authorization to one or more menus has expired. If the authorization has not expired, then the method 700 will loop back to the beginning of step 720 and again determine if the authorization has expired. If the authorization has expired, then the method 700 terminates authorization to the one or more menus in step 730.

In step 710, the method 700 may detect that the dongle is communicatively decoupled through various means. For example, the user may select a menu item on the interface 200 that dismounts the dongle 100 from the interface 200. That is, the dongle 100 may still be physically coupled to the interface 200 but may not be in communication with the interface 200 after being dismounted. Alternatively, the dongle 100 may be communicatively decoupled from the interface 200 by removing the dongle 100 from the interface 200. Alternative methods may be employed in other embodiments to communicatively decouple the dongle 100 from the interface 200.

Communicatively decoupling the dongle from the interface may start a timer that determines the expiration of access to one or more menus on the interface 200. For example, removing the dongle 100 from the interface 200 can cause the processor 212 to write a time-stamp to a register on the processor 212. Additionally or alternatively, communicatively decoupling the dongle from the interface may change the state of the register. The register may subsequently be accessed by the method 700 to terminate the authorization.

In step 720, the method 700 can determine if the authorization to the one or more menus has expired by, for example, determining if a certain amount of time has elapsed. With reference to the interface 200, the method 700 could periodically compare the time-stamp written to the register with an actual time obtained from a clock. When the difference between the actual time and the time-stamp is greater than a reference time, the method 700 could indicate that the authorization has expired.

In step 730, the method 700 can terminate authorization to the one or more menus. For example, the method 700 could prevent the user from inputting information, selecting menu items in the one or more menus, or the like. The method 700 could also prevent the user from reading data or accessing information on the interface. With reference to the interface 200 described in the foregoing, the processor 212 can terminate the authorization to the one or more menus. For example, the processor 212 could compare the one or more menus in the interface memory 214 with the authorized menus 122a in the program code 122. Menus that are not listed in the authorized menus 122a and do not require authorization may be accessible to all users.

As described in the foregoing, the methods 600, 700 are separate methods that authorize and terminate authorization to the interface. However, the methods 600, 700 could be a single method with a loop that continually determines if the dongle 100 is communicatively coupled to the interface 200. In addition, it can be appreciated that the methods 600, 700 may also control what menus are displayed by the interface. As an illustration, exemplary sequences of menus shown by the interface display 220 are described in the following.

Menus Displayed by an Interface

Figure 8:
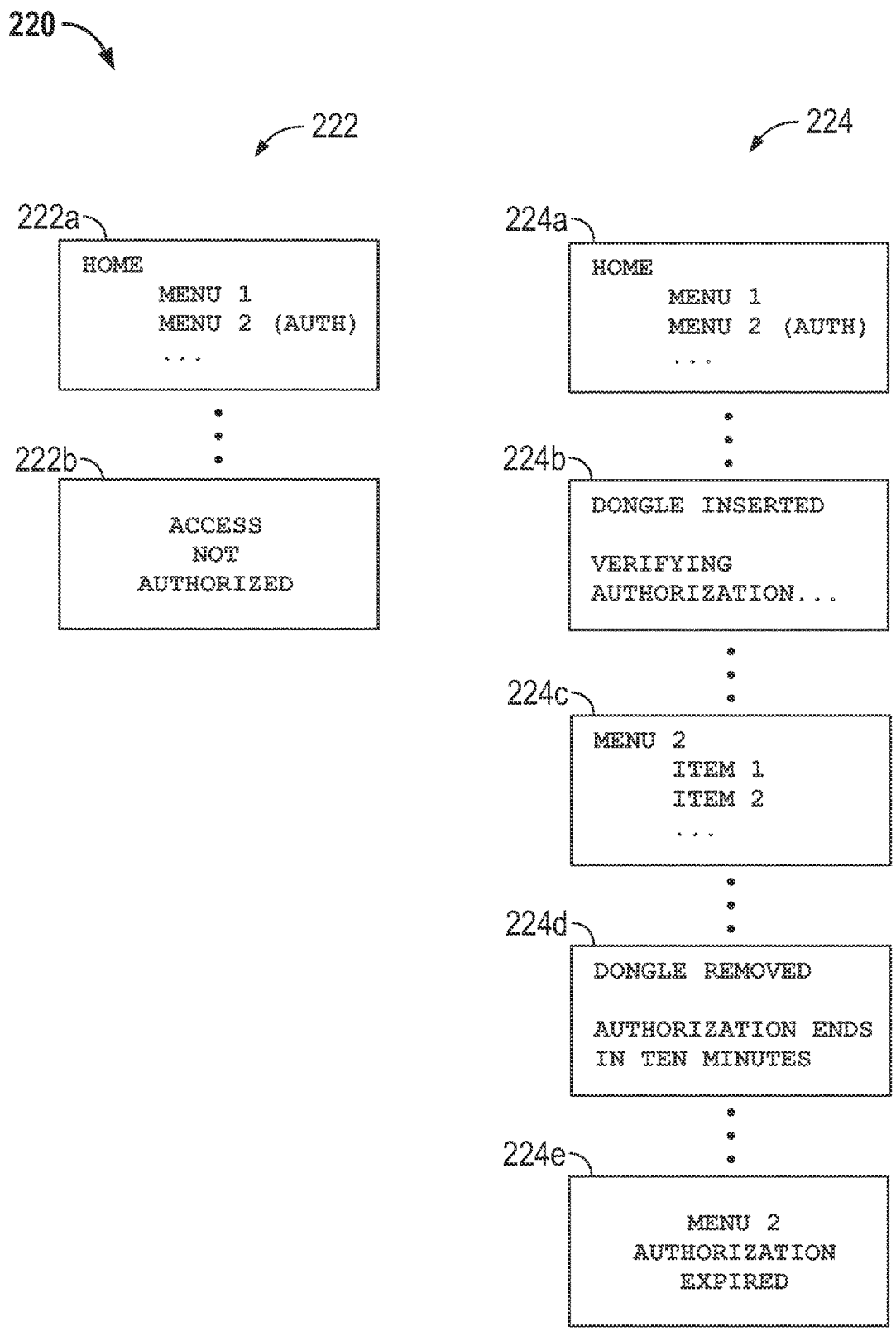
FIG. 8 shows exemplary menus displayed by the interface 200.

FIG. 8 shows exemplary menus displayed by the interface 200. As shown in FIG. 8, the interface display 220 has an unauthorized sequence 222 comprised of a home menu 222a and an unauthorized access notice 222b. The unauthorized sequence 222 illustrates menus that may be displayed to a user when the user attempts to access an unauthorized menu. Also shown in FIG. 8 is an authorized sequence 224 comprised of a home menu 224a, which may be the same as the home menu 222a of the unauthorized sequence 222, a dongle inserted notice 224b, an authorized menu 224c, a dongle removed notice 224d, and an expired authorization notice 224e. The authorized sequence 224 illustrates the menus that may be displayed to a user with authorized access to the interface 200. The following compares the unauthorized sequence 222 to the authorized sequence 224.

In the unauthorized sequence 222, the user may attempt to access the MENU 2 shown in the home menu 222a without the dongle 100. Since the dongle 100 is not inserted into the interface 200, the user is not authorized to access the MENU 2 displayed by the interface 200. Accordingly, when the user presses the select button 234, the interface 200 displays the unauthorized access notice 222b. The unauthorized access notice 222b may be displayed for a period of time before returning to the home menu 222a.

In the authorized sequence 224, the user may have the dongle 100 to obtain authorized access to the interface 200. When the home menu 224a is displayed, the user inserts the dongle 100 into the interface 200. The interface 200 can detect the dongle 100 and display the dongle inserted notice 224b. After the interface 200 authorizes access, the user selects MENU 2 by pressing the select button 234. The interface 200 may then display the authorized menu 224c.

The user may remove dongle 100 from the interface 200 during or after interacting with the interface 200. For example, the user may only need to read a single measurement from the interface 200. Therefore, the user may insert the dongle 100 long enough to obtain authorization to the authorized menu 224c. Alternatively, the user may remove the dongle 100 when the user is finished interacting with the interface 200. In either case, the user may have access to the authorized menu 224c until the authorization is terminated.

After the dongle 100 is removed or dismounted, the interface display 220 may display the dongle removed notice 224d, which informs the user of the time remaining for the authorization to the dongle removed notice 224d. In the embodiment shown, ten minutes remain although more or fewer time may remain in alternative embodiments. After the authorization has expired, the interface display 220 can display the expired authorization notice 224e. After a period of time, the interface display 220 may return to and display the home menu 224a. To obtain a re-authorization after the prior authorization has expired, the user may reinsert the dongle 100 into the interface 200.

The foregoing steps can be performed by the methods 600, 700 described in the foregoing. However, any suitable method for authorizing and terminating access to the interface 200 can be performed. For example, the dongle that is wirelessly enabled may be communicatively coupled with the interface 200 (or an alternative interface) without being physically attached to the interface 200. In addition, alternative menus and notifications can be displayed and/or alternative menu sequences may be employed. For example, the dongle inserted notice 224b and the dongle removed notice 224d may not be displayed in an alternative menu sequence.

It can be appreciated that, even though the dongle 100 may be locally available to control access to the interface 200, there may be circumstances in which it is advantageous to remotely control access to the interface 200. For example, there may be unplanned events, such as, for example, equipment breakdowns, catastrophic failures, personnel changes, or the like, when the dongle 100 is needed but not immediately available. Remotely controlling access will allow users to access the interface 200 in such events. An exemplary system and method for remotely controlling access to an interface is discussed in more detail in the following.

Remotely Controlling Access to an Interface

Figure 9:
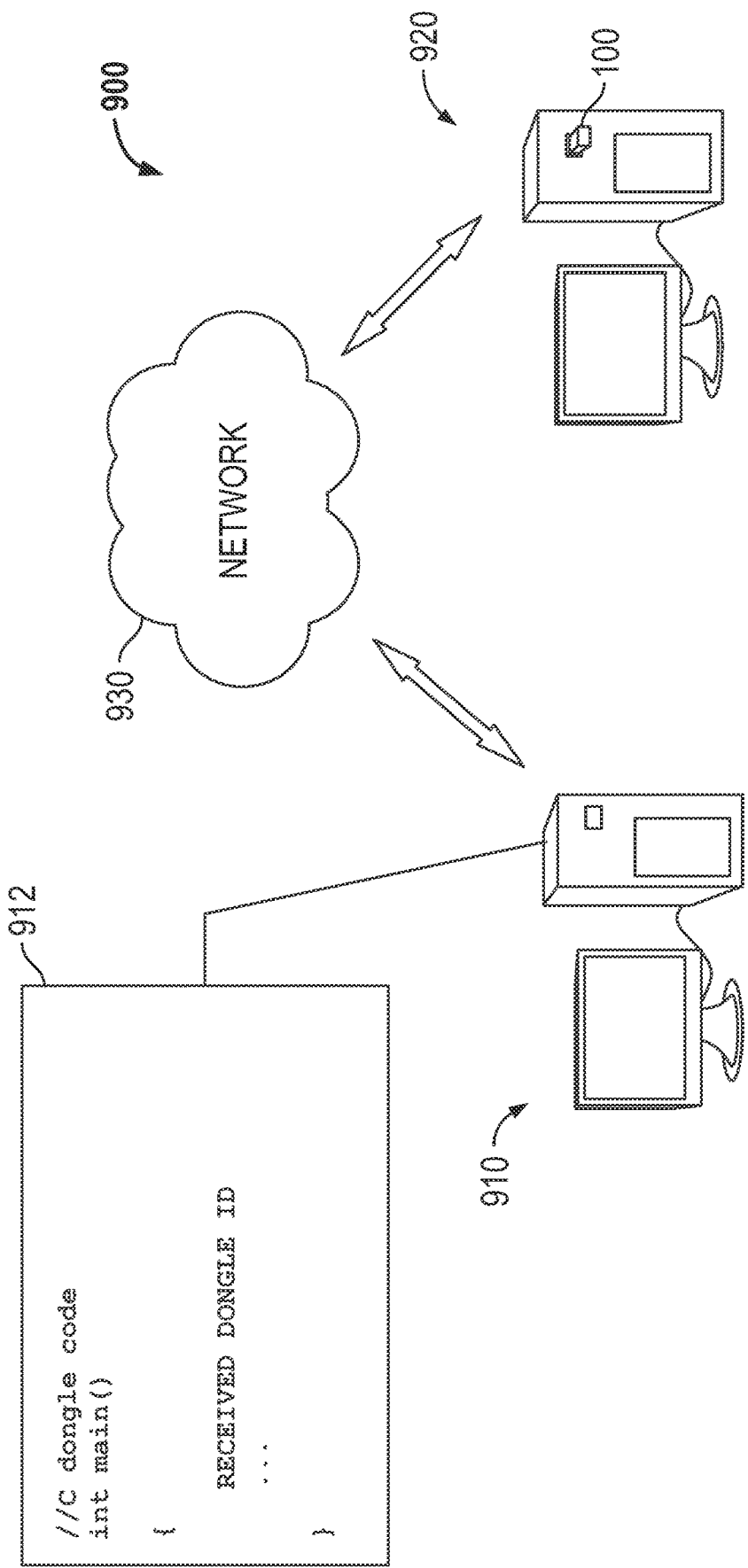
FIG. 9 shows a system 900 for remotely controlling access to the interface 200 according to an embodiment.

FIG. 9 shows a system 900 for remotely controlling access to the interface 200 according to an embodiment. As shown in FIG. 9, the system 900 is comprised of an authorizing workstation 910 that is in communication with a user workstation 920 via a network 930. The authorizing workstation 910 may be at a location that is, for example, in the United States. In an embodiment, the network 930 may be the Internet. The user workstation 920 may be at the user's location. According to an embodiment, the user's location can be an industrial location, such as, for example, an off shore oil rig, a petroleum processing plant, etc. The user workstation 920 is shown communicatively coupled to the dongle 100 described in the foregoing, although any suitable dongle can be employed in alternative embodiments.

The authorizing workstation 910 and the user workstation 920 may be configured to read and write to a program code, such as the program code illustrated by a callout 912 that extends from the authorizing workstation 910. The program code may be the program code 122 described in the foregoing. In the embodiment shown, the authorizing workstation 910 and the user workstation 920 may be personal computers that run an instance of a method that, for example, encodes a dongle ID into the program code. The authorizing workstation 910 and the user workstation 920 may also be configured to write or modify authorized menus in the program code, such as, for example, the authorized menus 122a described in the foregoing. The program code may be written to the dongle 100 that is communicatively coupled to the user workstation 920.

Although the authorizing workstation and the user workstation are described as being personal computers, other embodiments may employ authorizing and user workstations that are not personal computers. For example, the authorizing workstation and/or the user workstation may be a mobile device, such as a cell phone, tablet computer, or the like. In addition, an alternative dongle may not be inserted into the user workstation 920, but may instead be in wireless communication with the user workstation 920. In another embodiment, the wirelessly enabled dongle may be in wireless communication with the mobile device. Other configurations may be employed in alternative embodiments.

As can be appreciated, the system 900 can be employed to remotely control access to the interface 200, which may be at the user's location. For example, the system 900 can remotely control access by writing the dongle ID to the program code and then writing the program code to the dongle 100 with the user workstation 920, as will be described in more detail in the following with reference to FIG. 10.

Figure 10:
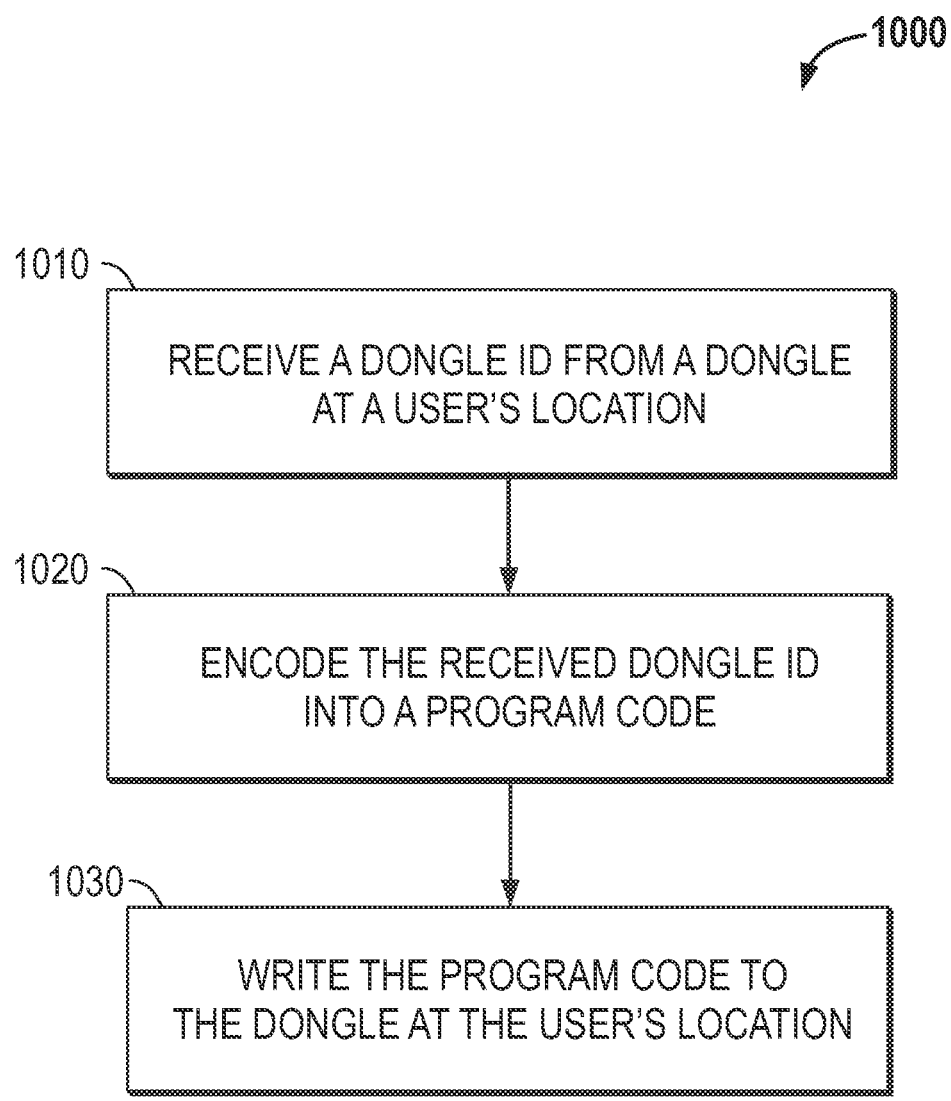
FIG. 10 shows a method 1000 for remotely controlling access to the interface 200 with the dongle 100 according to an embodiment.

FIG. 10 shows a method 1000 for remotely controlling access to the interface 200 with the dongle 100 according to an embodiment. The method 1000 begins with step 1010 by receiving a dongle ID from a dongle at a user's location. The dongle at the user's location may be the dongle 100 and the dongle ID may be the dongle ID 124 described in the foregoing. In step 1020, the method 1000 encodes the received dongle ID into a program code. The method 1000 then writes the program code to the dongle at the user's location. The program code may be intended for the dongle 100 shown in FIG. 9.

In step 1010, the method 1000 can receive the dongle ID from the dongle at the user's location by using the system 900 described in the foregoing although any suitable system can be employed in alternative embodiments. With reference to the system 900, the authorizing workstation 910 can receive the dongle ID 124 via the network 930. The dongle ID 124 may be sent after a query is sent by the authorizing workstation 910.

Alternatively, the dongle ID 124 may be sent by the user workstation 920 without a query from the authorizing workstation 910. For example, the user workstation 920 could execute a routine that sends a request to the authorizing workstation 910 along with the dongle ID 124.

In step 1020, the method 1000 can encode the received dongle ID into the program code. For example, the method 1000 could employ the authorizing workstation 910 to add the dongle ID to the appropriate line in the program code. The program code written to by the method 1000 may be the program code 122 described in the foregoing although any suitable program code can be employed.

In step 1030, the method 1000 writes the program code to the dongle at the user's location. For example, the method 1000 could transmit the program code from the authorizing workstation 910 to the user workstation 920 via the network 930. The method 1000 could then use the user workstation 920 to write the program code to the dongle 100. The program code written to the dongle 100 may be the program code with the received dongle ID shown in FIG. 9.

Although the foregoing method 1000 discusses the dongle ID being received by the authorizing workstation 910, the dongle ID may be received by other means. For example, the method 1000 could receive the dongle ID at the user workstation 920. The method 1000 could obtain approval from the authorizing workstation 910 to write the dongle ID to the program code without transmitting the dongle ID to the authorizing workstation 910. Alternative steps of receiving and encoding the dongle ID into the program code can be employed.

The embodiments described above provide for controlling access to the interface 200 with the dongle 100. As explained in the foregoing, controlling access to the interface 200 with the dongle 100 can ensure that computing resources on the interface 200 are not consumed by an undesirable number of logins. Access to the interface 200 can be controlled without issues associated with the login and password method. For example, the users do not have to remember their logins and are unable to share passwords. In addition, counterfeit dongles may be prevented because the program code 122 on the dongle 100 may be associated with the dongle 100. Access to the interface 200 can also be remotely controlled by the authorizing workstation 910. Accordingly, the users may expediently obtain authorization to the interface 200 even though the dongle 100 may not be immediately available.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods for controlling access to an interface with a dongle and not just to the embodiments described above and shown in the accompanying figures. Accordingly, the scope of the embodiments described above should be determined from the following claims.

I claim:

1. A dongle (100) for controlling access to an interface (200) of an industrial equipment, the dongle (100) comprising:
    a dongle memory (120) configured to communicatively couple to the interface (200), the dongle memory (120) comprising:
        a read-only memory storing a dongle identifier (124);
        a re-writable memory storing a program code (122) that includes authorized menus (122a);
    wherein the program code (122) is configured to authorize access to one or more menus on the interface (200) of the industrial equipment based on the authorized menus (122a) and the dongle identifier (124).

2. The dongle (100) of claim 1, wherein the dongle (100) further comprises a connector (110) communicatively coupled to the dongle memory (120), wherein the connector (110) is configured to communicatively couple to the interface (200).

3. The dongle (100) of claim 1, wherein the program code (122) further comprises a reference value (122b), wherein the reference value (122b) can be compared with the dongle identifier (124) to determine if the program code (122) is associated with the dongle (100).

4. The dongle (100) of claim 1, wherein the program code (122) is further configured to terminate authorization to the one or more menus on the interface (200) based on the authorized menus (122a).

5. The dongle (100) of claim 1, wherein the program code (122) is executed when the dongle (100) is at least one of communicatively coupled to the interface (200) and communicatively decoupled from the interface (200).

6. A system (10) for controlling access to an interface (200) of an industrial equipment with a dongle (100), the system (10) comprising:
    the dongle (100) configured to communicatively couple to the interface (200), the dongle (100) including a dongle memory (120) comprising:
        a read-only memory storing a dongle identifier (124); and
        a rewritable memory storing a program code (122) that includes authorized menus (122a); and
    a processor (212) communicatively coupled to the dongle memory (120), the processor (212) configured to:
        receive the program code (122) from the dongle memory (120); and
        execute the program code (122) to authorize access to one or more menus on the interface (200) of the industrial equipment based on the authorized menus (122a) based on the authorized menus (122a) and the dongle identifier (124).

7. The system (10) of claim 6, wherein the program code (122) further comprises a reference value (122b) and wherein the processor (212) is further configured to compare the reference value (122b) with the dongle ID (124) to determine if the program code (122) is associated with the dongle (100).

8. The system (10) of claim 6, wherein the processor (212) is configured to at least one of authorize access and terminate authorization to the one or more menus on the interface (200) based on the authorized menus (122a).

9. The system (10) of claim 6, wherein the processor (212) is further configured to terminate authorization to the one or more menus on the interface (200) when the program code (122) is executed by the processor (212).

10. The system (10) of claim 6, wherein the processor (212) is further configured to detect at least one of the dongle (100) communicatively coupled to the interface (200) and the dongle (100) communicatively decoupled from the interface (200).

11. A method for controlling access to an interface of an industrial equipment, the method comprising:
    detecting a dongle communicatively coupled to the interface, the dongle comprising a dongle memory with:
        a read-only memory storing a dongle identifier; and
        a rewritable memory storing a program code that includes authorized menus;
    reading the program code from the dongle memory with the interface; and
    executing the program code to authorize access to one or more menus on the interface of the industrial equipment based on the authorized menus and the dongle identifier.

12. The method of claim 11, wherein the program code further comprises a reference value wherein the method further comprises comparing with the dongle identifier to determine if the program code is associated with the dongle.

13. The method of claim 11, further comprising:
    detecting that the dongle is communicatively decoupled from the interface;
    determining if the authorization to the one or more of authorized menus on the interface has expired; and
    terminating access to the one or more menus on the interface.

14. The method of claim 11, wherein the program code is further configured to the terminate authorization to the one or more menus on the interface based on the authorized menus.

15. The method of claim 11, wherein the program code is executed when the dongle is one of communicatively coupled to the interface and communicatively decoupled from the interface.

16. A system (900) for remotely controlling access to an interface (200) of an industrial equipment with a dongle (100), the system (900) comprising:
   an authorizing workstation (910);
   a user workstation (920) communicatively coupled to the authorizing workstation (910) through a network (930);
   wherein the user workstation (920) is configured to write a program code (122) that includes authorized menus (122a) and a received dongle ID (124), the received dongle ID (124) being provided to the authorizing workstation (910) by the user workstation (920) that reads the dongle ID (124) from a read-only memory of the dongle (100).

17. The system (900) of claim 16, wherein at least one of the authorizing workstation (910) and the user workstation (920) is configured to encode the received dongle ID (124) into the program code (122).

18. The system (900) of claim 16, wherein at least one of the authorizing workstation (910) and the user workstation (920) is a mobile device.

19. A method for remotely controlling access to an interface of an industrial equipment with a dongle, the method comprising:
   receiving a dongle ID from a read-only memory of the dongle;
   encoding the received dongle ID into a program code; and
   writing the program code including authorized menus and the dongle ID to a re-writable memory of the dongle with a user workstation.

20. The method of claim 19, wherein the dongle ID is received by an authorizing workstation that is in communication with the user workstation through a network.

21. The method of claim 19, wherein the dongle ID is encoded into the program code by at least one of the authorizing workstation and the user workstation.

22. The method of claim 19, wherein at least one of the authorizing workstation and the user workstation is a mobile device.

* * * * *